Dec. 23, 1930.  H. H. KNOTT  1,786,071
SAW SETTING DEVICE
Filed March 5, 1929  2 Sheets-Sheet 1
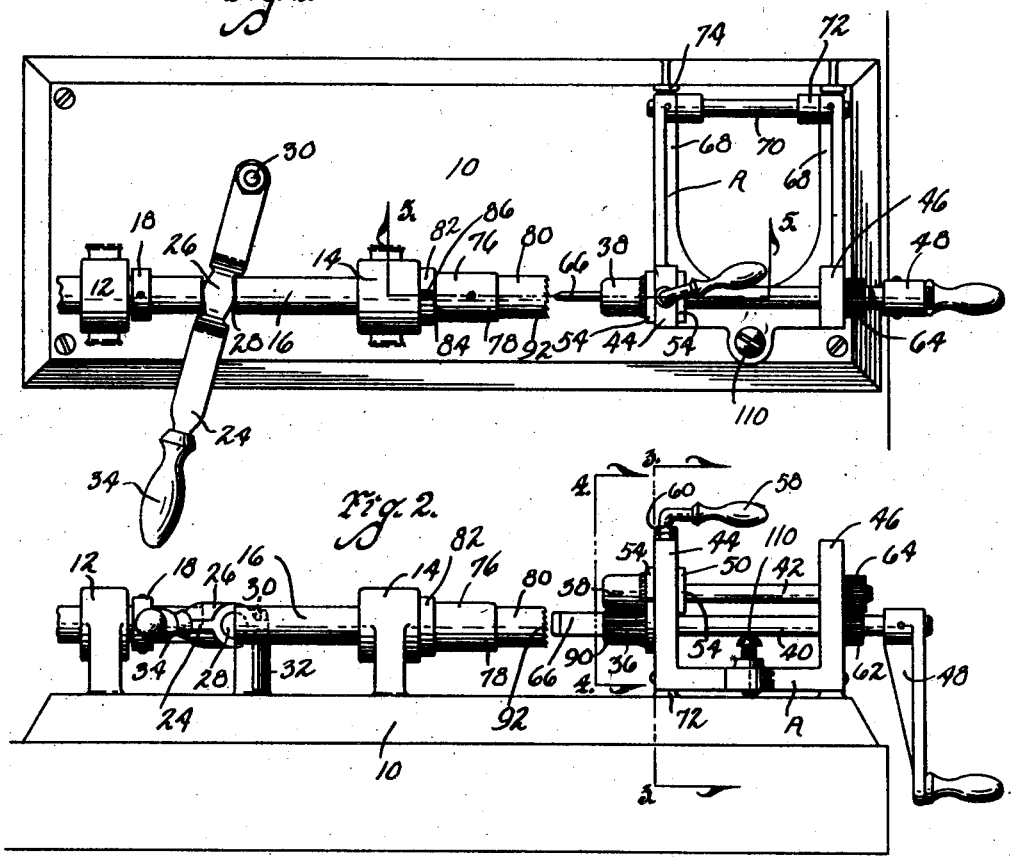
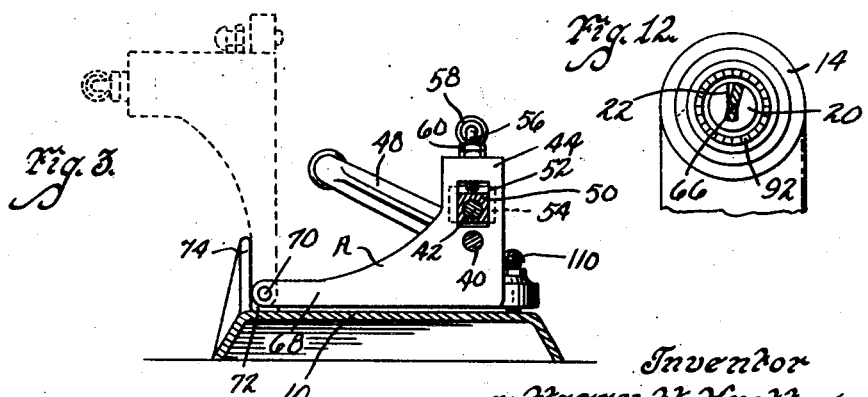
Witness
Vinton Read.
Inventor
Harry H. Knott
By Bair, Freeman & Sinclair
Attorneys

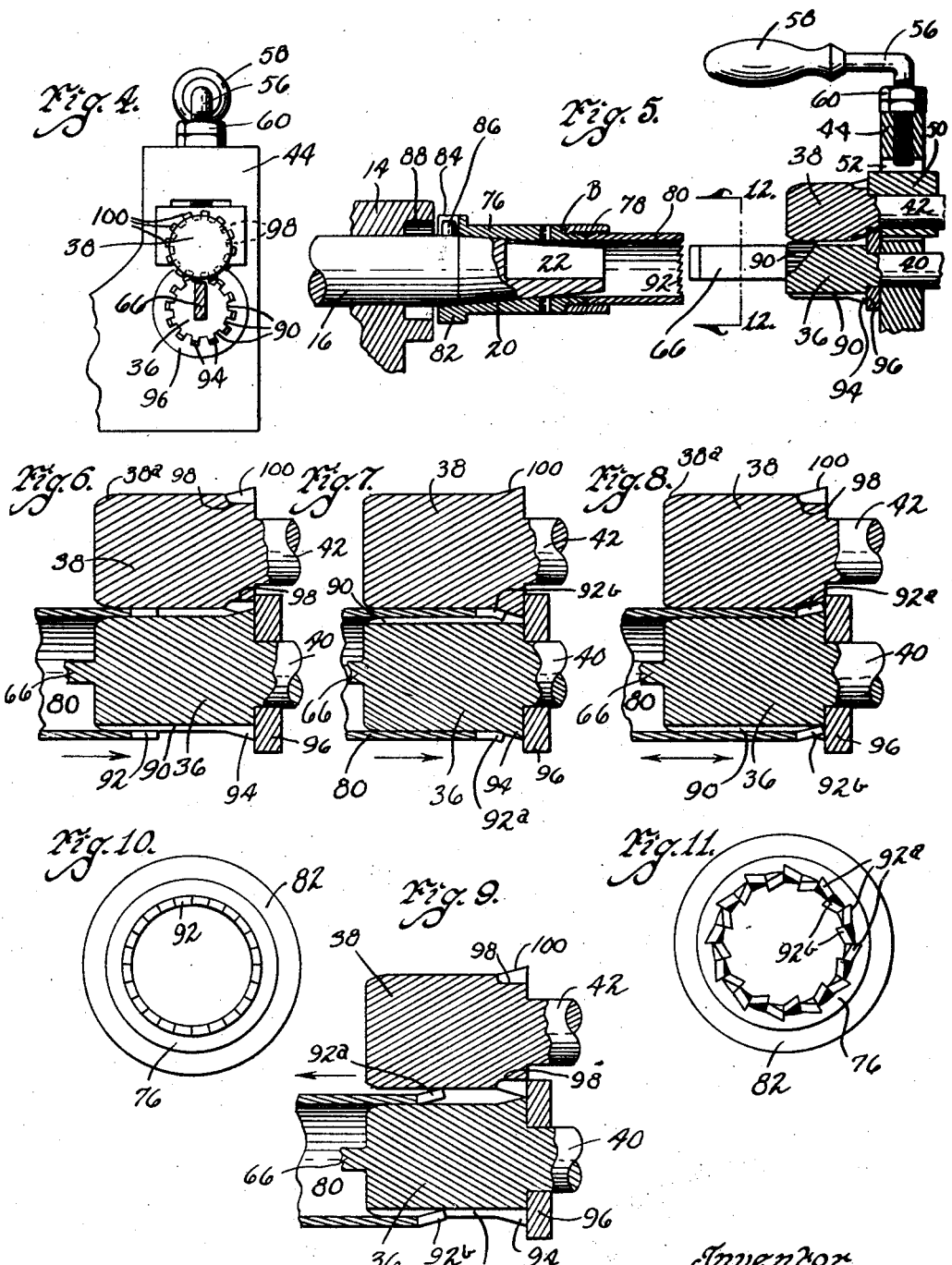

Patented Dec. 23, 1930

1,786,071

UNITED STATES PATENT OFFICE

HARRY H. KNOTT, OF WASHINGTON, IOWA, ASSIGNOR TO AMERICAN PEARL BUTTON COMPANY, OF WASHINGTON, IOWA

SAW-SETTING DEVICE

Application filed March 5, 1929. Serial No. 344,272.

The object of my invention is to provide a saw setting device of simple, durable and comparatively inexpensive construction.

A further object is to provide a saw setting device especially adapted for setting the teeth of tubular saws, such as those used in button blank lathes.

A further object is to provide such a device in which the teeth of the saw may be accurately and efficiently set by a rolling operation or by means of two coacting rollers, adapted to roll the set into the teeth rather than by driving it into them, or setting them by other methods now in use.

More particularly, it is my object to provide a roller adapted to be inserted in the tubular saw and having lugs for setting every other tooth with a single roller coacting with the first one and having lugs to set the remaining teeth of the saw when the two rollers are rolled together.

Still a further object is to provide for the saw setting rollers a hinged frame adapted to be raised so that a tubular saw can be easily inserted in the saw setting device.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a plan view of my saw setting device, showing a saw in position, ready to be set.

Figure 2 is a side elevation of the same.

Figure 3 is a cross-sectional view on the line 3—3 of Figure 2.

Figure 4 is an enlarged sectional view on the line 4—4 of Figure 2.

Figure 5 is an enlarged section on the line 5—5 of Figure 1.

Figure 6 is an enlarged view of a portion of Figure 5, illustrating the saw being pushed on to the lower saw setting roller.

Figures 7, 8, and 9 are similar to Figure 6, showing the saw in different positions relative to the saw setting rollers.

Figure 10 is an end elevation of a tubular saw showing the teeth without set.

Figure 11 is a similar view showing the teeth after they are set; and

Figure 12 is a sectional view on the line 12—12 of Figure 5.

On the accompanying drawings I have used the reference numeral 10 to indicate a base for supporting the various parts of my device.

Bearing members 12 and 14 are formed on the base 10 or suitably secured thereto and are adapted to slidably and rotatably receive a supporting shaft 16. The shaft 16 is provided with a collar 18 adjacent the bearing 12 and the opposite end of the shaft 16 is tapered as indicated at 20. (See Figure 5.) The tapered portion 20 of the shaft 16 has a slot 22 cut therein extending only partially diametrically therethrough for a purpose hereinafter to be fully set forth.

For sliding the shaft 16 I provide a lever 24 having a yoked portion 26 straddling the shaft. The yoked portion 26 coacts with shoulders at the end of a reduced portion 28 of the shaft 16. The lever 24 is pivoted at one end as indicated at 30 to a boss 32. The other end of the lever is provided with a handle 34.

My device includes a pair of saw setting rollers 36 and 38 mounted or suitably secured to shafts 40 and 42. The shaft 40 is journaled in uprights 44 and 46 which are part of a frame A.

An operating crank 48 is secured to the shaft 40 whereby the same may be manually rotated. The shaft 42 has one end journaled in the upright 46 and its other end journaled in a block 50 which is slidably mounted relative to the upright 44. A slot 52 is provided in the upright 44 to receive the block 50, the block itself being provided with flanges 54 thereon, to prevent dislodgment of the block from the slot 52.

The block 50 is limited as to the upward movement in the slot 52 by means of a set screw 56, terminating in a handle 58. Lock nuts 60 are provided on the set screw 56 to limit the downward movement thereof when rotated in a predetermined direction.

The shaft 40 acts as a drive shaft when rotated by the crank 48 and is provided with a pinion 62 for driving the shaft 42. The shaft 42 is provided with a pinion 64 coacting with the pinion 62. The roller 36 is provided with a tongue 66 adapted to coact with the slot 22 of the shaft 16 when the shaft assumes a predetermined position.

The frame A is provided with laterally extending arms 68 which are pivoted to the base 10 by means of a pin 70 and bosses 72. The frame A may be raised to an upright position as shown in the Figure 3 and in such position rests against stops 74 as shown in dotted lines in Figure 3.

I have illustrated my device in connection with a tubular saw B consisting of a sleeve 76 internally tapered and having a coupling 78 screw threaded thereon. A tubular saw member 80 is also threaded to extend into the coupling 78. The sleeve 76 is provided with an annular enlargement 82 having slot 84. The shaft 16 is provided with a pin 86 adapted to enter the slot 84 of the sleeve 76. In Figure 5 the bearing 14 is illustrated as having a recess 88 into which the pin 86 may be drawn.

The saw setting roller 36 is provided with a plurality of longitudinal grooves 90, adapted to correspond with every other tooth 92 of the tubular saw member 80. Between the grooves 90, the roller 36 at one end thereof is provided with tapered lugs 94. Adjacent the lugged end of the roller 36 a stop washer 96 is provided. The saw setting roller 38 is provided with a plurality of depressions 98 adapted when the two rollers are rotated with their peripheries together to receive the lugs 94 of the roller 36. Between the depressions 98 tapered lugs 100 are provided on the roller 38.

*Practical operation*

In the operation of my device the frame A is swung to the dotted line position shown in Figure 3, whereupon the tubular saw member and the sleeve to which it is attached may be positioned on the tapered portion 20 of of the shaft 16. The notch 84 is caused to be aligned with the pin 86 whereby the teeth 92 of the tubular saw member 80 assume a predetermined position relative to the slot 22.

The frame A is then lowered, the set screw 56 tightened so as to limit the upward movement of the block 50 and consequently the roller 38 whereafter the operator begins to rotate the shaft 40. As he rotates the shaft 40 he pulls the handle 34 toward the right so that the guide blade 66 on the roller 36 may enter the tubular saw 80 and finally be pushed into the slot 22. By designing the blade 66 offset from the center of the roller 36 it will be obvious that the shaft 16 may be rotated by the shaft 40 due to the blade 66 entering the groove 22 with the teeth 92 of the saw 80 assuming a predetermined position so that every other tooth of the saw 80 overlies a groove 90 of the roller 36.

The operator, during the saw setting operation, continues to turn the crank 48 and at the same time move the handle 34 toward the right which causes the saw 80 to progressively assume the positions shown respectively in Figures 6, 7 and 8. In Figure 6 the saw is starting on to the roller 36. In doing so it has engaged the bevelled end 38a of the roller 38 and raised it the thickness of the saw, (since the roller would normally assume a position against the roller 36 by gravity as shown in Figure 5). Figure 7 illustrates every other tooth 92 just starting on to the lugs 94 of the roller 36, whereby half of the teeth as indicated by the reference numeral 92a are set by being bent outwardly and the other half 92b are set by being bent inwardly by the lugs 100 of the roller 38.

This bending or setting of the teeth is a gradual rolling process since the handle 34 is slowly moved toward the right, while the shaft 40 is being continually rotated. The inwardly bent teeth 92b extend into the grooves 90 of the roller 36 while the outwardly bent teeth 92b extend into the depressions 98 of the roller 38, as clearly shown in Figures 7 and 8. When the ends of the teeth 92 engage the stop washer 96 whereupon the teeth have been fully set and the saw is now ready to be removed from the device.

In removing the saw, the set screw 56 is first loosened after which the lever 34 is moved to the left thereby removing the saw from the roller 36 as shown in Figure 9. It will be noted that the inwardly set teeth 92a are being pulled through the grooves 90 while the upper most outwardly set tooth 92b has been pulled from the recesses 98 and, in sliding has raised the roller 38. Thus, it will be obvious that loosening the set screw 56 has provided the necessary clearance between the set screw and the block 50 to allow the roller 38 to move upwardly so as not to pull the set out of the upper most tooth 92b. The lock nuts 60 may be set at any desired position to accommodate tubular saw 80 of different thicknesses or for varying the amount of set as desired. It will be noted that the maximum amount of set has been given to the saw illustrated in the drawings.

Further movement of the handle 34 to the left will cause the enlargement 82 of the saw B to engage the bearing 14 after which further movement of the shaft 16 will cause the pin 86 to be drawn into the recess 88. This results in the tubular saw being forced from the tapered portion 20 of the shaft 16. The frame A may now be raised so that the saw may be removed from the saw setting device. A screw 110 is provided for the purpose of adjusting the height of the frame A and thereby aligning the axis of the roller 36 with the axis of the tubular saw.

Where it is desirable to mount the uprights 44 and 46 permanently on the base 10, the shaft 16 may be arranged to slide away from the roller 36 a greater distance for allowing the tubular saw to be placed in the device or removed therefrom. Instead of the blade 66 and slot 22 for rotating the saw, an additional shaft could be provided. Such shaft could be geared to the pinion 62 and to the shaft 16 by cutting teeth in the shaft 16. To allow for sliding movement of the shaft 16, the teeth cut therein could be arranged to extend a considerable distance longitudinally thereof.

Although I have illustrated a specific type of tubular saw to be used in connection with the device, other types may be also set, such as those of split tubular type now in general use. A slight modification in the shaft 16, so that it may support other types of tubular saws may be made without departing from the real spirit and purpose of my invention. The coacting rollers 36 and 38 may also be used for setting a straight saw such as a hand saw, the lugs 94 and 100 being designed for the particular teeth of the saw. A suitable guide could be arranged for the straight saw so it may be moved lengthwise between the rollers 36 and 38 while they are rotating, whereupon the teeth of such saw will have set rolled into them.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A tubular saw setting device comprising means for supporting a tubular saw and for moving it longitudinally of its axis, a roller of substantially the same external diameter as the interior diameter of said saw and adapted to be received in said saw, said roller having lugs for setting a portion of the teeth of said saw, a second roller cooperatively associated therewith for setting the remaining portion of said teeth and means to rotate the saw while the teeth thereof are being set.

2. A tubular saw setting device comprising means for supporting a tubular saw, a roller to be received in said saw and being of such size relative to the internal diameter of said saw as to support it while the teeth thereof are being set, said roller having lugs for setting a portion of the teeth of said saw, a second roller associated therewith for setting the remaining portion of said teeth, means for rotating said first roller and means for causing corresponding rotation of the saw and the second roller from the first roller.

3. A tubular saw setting device comprising means for supporting a tubular saw, a roller to be received in said saw and being of such size relative to the internal diameter of said saw as to support it while the teeth thereof are being set, said roller having lugs for setting a portion of the teeth of said saw, a second roller associated therewith for setting the remaining portion of said teeth, means for rotating said first roller and tongue and slot, means for causing corresponding rotation of the said saw supporting means simultaneously with the rotation of the first roller.

4. A tubular saw setting device comprising means for supporting a tubular saw, a roller to be received in and fit said saw, said roller having lugs for setting a portion of the teeth of said saw, a second roller associated therewith for setting the remaining portion of said teeth and movable toward and away therefrom, means for rotating said first roller and means for causing corresponding rotation of the saw and the second roller from the first roller, the second roller upon movement away from the first one, allowing removal of the saw from the first roller in a direction longitudinally of the axis of such roller.

5. A tubular saw setting device comprising means for supporting a tubular saw, a roller to be received in said saw for thereby supporting it when being set, said roller having lugs for setting a portion of the teeth of said saw and a second roller and means for operatively connecting said rollers and first means together for simultaneous rotation.

6. In a tubular saw setting device, a base, a longitudinally slidable saw supporting arbor thereon adapted to be received in a tubular saw, a roller in alignment with said arbor, a second roller adjacent the first roller, said rollers having lugs for setting the teeth of said saw, means for imparting sliding movement to the arbor and means to impart rotation to the rollers for setting the teeth of the tubular saw and means to rotate the saw.

7. In a tubular saw setting device, a base, a longitudinally slidable saw supporting arbor thereon adapted to be received in a tubular saw, a frame pivoted to said base, a roller carried by said frame and in alignment with said arbor, a second roller carried by said frame and adjacent the first roller, said rollers having lugs for setting the teeth of said saw, means for imparting sliding movement to the arbor and means to impart rotation to the rollers for setting the teeth of the tubular saw and means to rotate the saw supporting arbor.

8. In a tubular saw setting device, a base, a longitudinally slidable saw supporting arbor thereon adapted to be received in a tubular saw, a roller in alignment with said arbor, a second roller adjacent the first roller, said rollers having lugs for setting the teeth of said saw, means for imparting sliding movement to the arbor and means for imparting rotation to the rollers for setting the teeth of the tubular saw, said arbor and said first roller having operatively coacting means to cause rotation of the arbor simultaneously with the rotation of the rollers.

Des Moines, Iowa, February 13, 1929.

HARRY H. KNOTT.